(12) United States Patent
Hosokawa et al.

(10) Patent No.: US 7,597,866 B2
(45) Date of Patent: Oct. 6, 2009

(54) TRANSLUCENT LUTETIUM OXIDE SINTER, AND METHOD FOR MANUFACTURING SAME

(75) Inventors: Shunsuke Hosokawa, Mitoyo (JP); Hideki Yagi, Mitoyo (JP); Takagimi Yanagitani, Mitoyo (JP)

(73) Assignee: Konoshima Chemical Co., Ltd., Osaka (JP)

( * ) Notice: Subject to any disclaimer, the term of this patent is extended or adjusted under 35 U.S.C. 154(b) by 199 days.

(21) Appl. No.: 11/630,528

(22) PCT Filed: Sep. 28, 2004

(86) PCT No.: PCT/JP2004/014177

§ 371 (c)(1), (2), (4) Date: Dec. 21, 2006

(87) PCT Pub. No.: WO2006/003726

PCT Pub. Date: Jan. 12, 2006

(65) Prior Publication Data

US 2008/0025895 A1      Jan. 31, 2008

(30) Foreign Application Priority Data

Jul. 2, 2004      (JP)      ............................. 2004-196400

(51) Int. Cl.
  *C04B 35/50*      (2006.01)
(52) U.S. Cl. ........................ 423/263; 501/152; 501/126; 501/153; 264/681

(58) Field of Classification Search .................. 423/263; 264/65, 1.2
See application file for complete search history.

(56) References Cited

U.S. PATENT DOCUMENTS

| | | | | |
|---|---|---|---|---|
| 3,026,210 A | * | 3/1962 | Coble | 501/153 |
| 4,098,612 A | * | 7/1978 | Rhodes et al. | 501/127 |
| 4,285,732 A | * | 8/1981 | Charles et al. | 501/101 |
| 4,421,671 A | * | 12/1983 | Cusano et al. | 252/301.4 F |
| 4,466,929 A | * | 8/1984 | Greskovich et al. | 264/1.22 |
| 4,466,930 A | * | 8/1984 | Greskovich et al. | 264/1.22 |
| 5,001,093 A | * | 3/1991 | Roy et al. | 501/120 |
| 5,116,560 A | * | 5/1992 | Dole et al. | 264/1.22 |
| 5,587,346 A | * | 12/1996 | Zuk | 501/152 |
| 6,093,347 A | * | 7/2000 | Lynch et al. | 252/301.4 R |
| 6,825,144 B2 | * | 11/2004 | Hideki et al. | 501/152 |

FOREIGN PATENT DOCUMENTS

| | | | |
|---|---|---|---|
| JP | 05-117025 A | 5/1993 |
| JP | 6-211573 A | 8/1994 |
| JP | 9-315865 A | 12/1997 |
| JP | 11-157933 A | 6/1999 |
| JP | 11-278933 A | 10/1999 |
| JP | 2004-317482 A | 11/2004 |

* cited by examiner

*Primary Examiner*—Melvin C Mayes
*Assistant Examiner*—Colette Nguyen
(74) *Attorney, Agent, or Firm*—The Webb Law Firm

(57) ABSTRACT

The present invention provides a lutetium oxide sinter to which yttrium is added in an amount of 100 mass ppm to 7000 mass ppm, whose average particle size is from 0.7 to 20 μm, and with which there is no precipitation of a hetero phase containing yttrium at the grain boundary.

5 Claims, 1 Drawing Sheet

F I G. 1
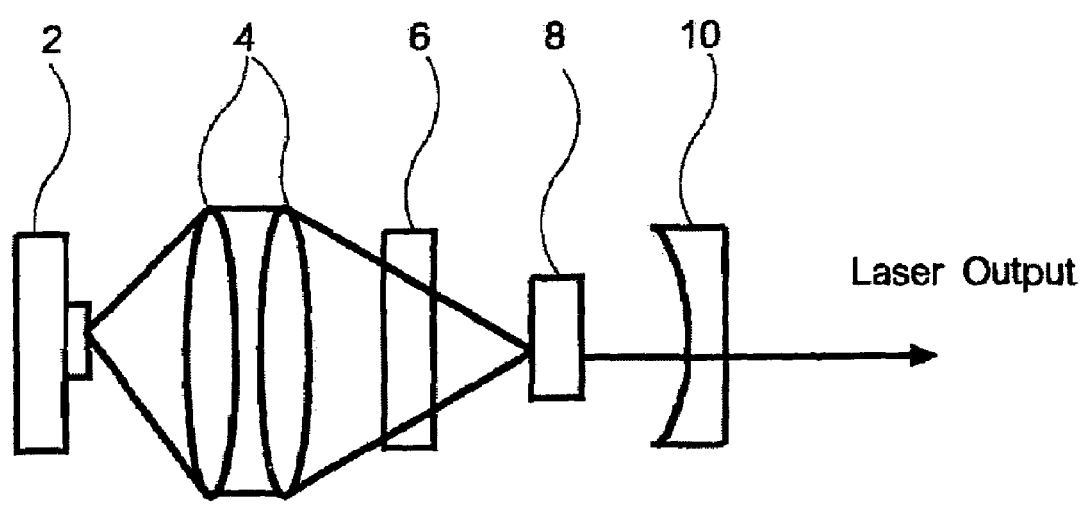
2: 1W LaserDiode   4: Lense   6: HR   8: Nd:Lu2O3   10: OC:T-3%
   (808nm)            f=8mm             Ceramics         R=50mm

TRANSLUCENT LUTETIUM OXIDE SINTER, AND METHOD FOR MANUFACTURING SAME

TECHNICAL FIELD

This invention relates to a translucent lutetium oxide sinter expressed by the general formula $Lu_2O_3$, and to a method for manufacturing the same. The present invention can be used favorably as an infrared beam transmission window, a discharge lamp envelope, an optical part, a scintillator, or a laser oscillator, for example.

BACKGROUND ART

Lutetium oxide, expressed by $Lu_2O_3$ (hereinafter referred to as lutetia) has a cubic crystal structure and no birefringence. This means that it is possible to obtain a sinter with excellent translucency by completely removing segregation caused by pores or impurities. Lutetia has a melting point of over 2490° C., and is known to be a material with excellent heat resistance. Furthermore, because of its high thermal conductivity, it holds promise as a solid state laser host material, and its theoretical transmissivity is approximately 82%. However, lutetia is far more expensive than other rare earth oxides, and consequently almost no research has gone into methods for producing single crystals thereof. Also, because of its extremely high melting point, it is difficult to synthesize large crystals with excellent optical properties with existing single crystal synthesis technology.

Meanwhile, ceramics (polycrystalline substances) can be synthesized at relatively low temperatures below the melting point, so there has for some time now been considerable research into yttrium oxide (yttria) and other rare earth oxides with a high melting point, in an effort to apply these materials to infrared high-temperature window materials, discharge lamp envelopes, corrosion-resistant components, and so forth. In regard to the sintering of polycrystalline, translucent rare earth oxides, the inventors have proposed a method in which aluminum is added as a sintering auxiliary in an amount of 5 to 100 mass ppm to a rare earth oxide (Japanese Laid-Open Patent Application 2003-89578). Nevertheless, the inventors have discovered that controlling the addition of aluminum is not easy with this method because the aluminum is added in such a tiny amount, and in some cases laser oscillation may not be achieved, for example, among other problems.

In addition, let us describe the raw material powder for a rare earth oxide. Oxalates in the form of mother salts most often used as the raw material powder for rare earth oxides. The raw material powders obtained by calcining these oxalates are composed of highly aggregated secondary particles and their particle size distributions are not uniform. Accordingly, packing by molding can not be accomplished sufficiently, and it is not easy to produce high density bodies. To improve this point, methods for manufacturing transparent bodies by low temperature sintering and using easily sinterable raw material powders have been disclosed in recent years (see, for example, Japanese Laid-Open Patent Applications H9-315865 and H11-278933). With these methods, powders whose particle size distributions are relatively uniform and which undergo little aggregation, which are obtained by using carbonates as the mother salts because they can be fired at lower temperatures, and then calcining these, are used as the starting raw material. However, thoroughly eliminating pores during sintering is essential to increasing the transmissivity of a sinter, and the highest linear optical transmissivity that can be attained with just improvements to the raw material powder of a rare earth oxide is about 70%. A sintering auxiliary is necessary to obtain higher transmissivity.

DISCLOSURE OF THE INVENTION

It is an object of the present invention to provide a lutetium oxide sinter that exhibits good translucency from the visible region to the infrared region by using an industrially practical technique, and a method for manufacturing this sinter.

With the translucent lutetium oxide sinter of the present invention, the yttrium content is at least 100 mass ppm and not more than 0.7 mass %, and the linear optical transmissivity at a thickness of 1 mm over a wavelength region from 500 nm to 6.5 µm is at least 80%. Preferably, the average particle size of the sinter is at least 0.7 µm and not more than 20 µm. Also, preferably, the linear optical transmissivity at a thickness of 1 mm over a wavelength region from 400 nm to 500 nm is at least 70%.

With the method of the present invention for manufacturing a translucent lutetium oxide sinter, a lutetium oxide raw material powder with a BET value of at least $2.0 \, m^2/g$ and not more than $15.0 \, m^2/g$, a mass percentage of aggregated particles of 5 µm or larger of not more than 10%, and a purity of at least 99.9% is used to produce a molded article with a density of at least 58% and a yttrium content of at least 100 mass ppm and not more than 0.7 mass %, and, if desired, the binder is removed from this molded article by heat treatment, after which this product is sintered for at least 0.5 hour in hydrogen, a rare gas, or a mixed atmosphere of these, or in a vacuum, at a temperature of at least 1450° C. and not higher than 1750° C. to obtain a translucent lutetium oxide sinter.

Preferably, after the above sintering, the sinter is subjected to hot isostatic pressing (HIP) for at least 0.5 hour at a temperature from 1450° C. to 1750° C. and a pressure from 49 to 196 MPa. The HIP temperature is even more preferably from 1500° C. to 1750° C., with a range of 1600° C. to 1750° C. being particularly favorable.

As a result of various investigations aimed at solving the above problems, the inventors discovered that a lutetium oxide sinter in which the linear optical transmissivity at a thickness of 1 mm (t=1 mm) over a wavelength region from 500 nm to 6.5 µm is at least 80% can be produced by using a yttrium sintering auxiliary in an amount of at least 100 mass ppm and no more than 0.7 mass %. To this end, a high-density molded article with a managed yttrium content is produced using a raw material powder with a managed purity, primary particle size, and secondary particle size, and this molded article is sintered in hydrogen, a rare gas, or a mixed atmosphere of these, or in a vacuum, such that the average particle size of the sinter will be between 0.7 and 20 µm. Furthermore, submicron and smaller pores can be eliminated and a decrease in linear optical transmissivity at wavelengths shorter than 500 nm can be prevented if the sinter obtained by the above sintering is subjected to hot isostatic pressing at a temperature from 1450° C. to 1750° C. and a pressure from 49 to 196 MPa. In this region, excluding a specific absorption wavelength, the linear optical transmissivity is generally low on the short wavelength side, and in most cases the optical transmissivity is substantially constant at 1 µm and above. For example, if optical transmissivity is measured at about three wavelengths, such as 500 nm, 800 nm, and 1000 nm, the optical transmissivity becomes fairly clear over the entire range from 500 nm to 6.5 µm.

BRIEF DESCRIPTION OF THE DRAWINGS

FIG. 1 is a simplified diagram of a laser oscillation test apparatus in which was used the translucent lutetium oxide sinter of a test example.

DESCRIPTION OF LETTERS OR NUMERALS

2: laser diode
4: lens
6: half-mirror
8: lutetium oxide sinter
10: optical coupler

BEST MODE FOR CARRYING OUT THE INVENTION

A working example of the present invention will now be described. In the sintering of lutetia, yttrium in an amount of at least 100 mass ppm and no more than 0.7 mass % exhibits a powerful effect as a sintering auxiliary. Obtaining a linear optical transmissivity of at least 80% is very difficult when gallium or scandium, or lanthanum, neodymium, terbium, holmium, thulium, ytterbium, or another rare earth element is added instead of yttrium. Furthermore, when a laser active element is added, the linear optical transmissivity is determined except for a specific absorption wavelength. In this Specification, unless otherwise specified, the yttrium content is expressed as a mass ratio, calculated as metal. The density of a molded article is expressed as a ratio to the theoretical density.

In general, a sintering auxiliary segregates at the grain boundary and reduces the velocity of grain boundary migration, which in turn controls the velocity of grain growth and effects the densification of the sinter. The details of the densification mechanism of yttrium are not clear, but the effect is achieved only when the sintering temperature is between 1450° C. and 1750° C. When the temperature is over 1750° C., abnormal grain growth is promoted and foreign phases containing yttrium are produced. If the sintering temperature is under 1450° C., the resulting sinter will be opaque or semitransparent because densification will not proceed sufficiently, regardless of whether or not yttrium is contained or the amount thereof. The average particle size of the sinter is normally less than 0.7 µm, although this also depends on the sinterability of the raw materials being used and other factors.

When a molded article with a theoretical density ratio of at least 58% and a yttrium content of at least 100 mass ppm and no more than 0.7 mass % is sintered at a temperature of at least 1450° C. and no higher than 1750° C., the average particle size of the sinter thus obtained will be at least 0.7 µm and no more than 20 µm, and this sinter will have excellent translucency. When a sample with a yttrium content of less than 100 mass ppm is sintered under the same conditions, the average particle size will again be about at least 0.7 µm and no more than 20 µm, but the resulting sinter will be opaque or semitransparent. If the yttrium content is over 0.7 mass %, however, the grain growth will proceed so much that the resulting sinter will contain pores, have a large average particle size, and be opaque or semitransparent.

When sintering is performed at a temperature over 1750° C., regardless of the yttrium content, grain growth will proceed so much that pores cannot be sufficiently eliminated, making it difficult to produce a sinter that is sufficiently translucent. Also, the average particle size of the sinter will be over 20 µm in this case. Furthermore, if a sample to which yttrium has been added is sintered at over 1750° C., segregated phases of yttrium are produced at the grain boundaries. Precipitation of yttrium depends on the yttrium content and on the average particle size of the sinter, and as the yttrium content and the average particle size increase, there is more of this precipitation, which is accompanied by a decrease in optical transmissivity. If the average particle size of the sinter is over 20 µm, segregation of yttrium starts to occur at the grain boundaries, and becomes pronounced once the average particle size reaches 30 µm and above.

To sinter at 1750° C. or below, which is a temperature far below the melting point, and lower the average particle size to 20 µm or less, it is necessary to produce a high-density molded article, and the density of a molded article after degreasing and before sintering has been found experimentally to be 58% or higher. If the BET value (BET specific surface area) of a raw material powder is over 15 $m^2/g$, the powder will be too fine and not easy to handle, and it will be difficult to raise the molded article density. Also, it is not easy to densify a material at low temperature if the BET value is less than 2 $m^2/g$. Therefore, from the standpoints of ease of sintering, packing, and handling, it is preferable for the BET value of the raw material being used to be at least 2 $m^2/g$ and no higher than 15 $m^2/g$, with a range of about at least 4 $m^2/g$ and no higher than 8 $m^2/g$ being even better. The size of secondary aggregated particles becomes a problem in the production of a high-density molded article. Voids as large as several microns that are produced by ordinary molding are present in between secondary aggregated particles. These large voids are difficult to remove even by HIP and other such pressurized sintering processes, and are a source of lower optical transmissivity. Therefore, it is preferable to use a raw material powder with a uniform particle size distribution, in which the mass percentage of secondary aggregated particles larger than 5 µm is no more than 10%, and preferably no more than 5%.

Even with the lutetium oxide sinter in the working examples, the optical transmissivity can in rare cases drop extremely low at wavelengths shorter than 500 nm. This is because pores are not sufficiently eliminated because of the temperature distribution in the furnace and so forth, and a large number of submicron and smaller pores remain in the sinter. A sinter such as this can be subjected to hot isostatic pressing (HIP) and made into a sinter with a good optical transmission spectrum. The pressurization gas is preferably a commonly used gas such as argon, and the treatment temperature between 1450° C. and 1750° C. Treatment below 1450° C. will have no effect, but if the temperature is over 1750° C., grain growth will proceed and segregated yttrium phases will be produced. The treatment pressure is preferably at least 49 MPa and no higher than 196 MPa. The treatment will have no effect below 49 MPa, but there will be no additional treatment effect when 196 MPa is exceeded. The treatment duration is preferably at least 0.5 hour, and the treatment time will vary with the thickness of the article being treated, the treatment temperature, and so on. HIP is performed on all lutetium oxide sinters, but may, for example, be performed on just those whose transmissivity is low at wavelengths shorter than 500 nm.

A high-purity lutetium oxide raw material powder with a purity of at least 99.9%, a BET value of at least 2.0 $m^2/g$ and no more than 15.0 $m^2/g$, and a mass percentage of secondary aggregated particles larger than 5 µm of no more than 10% is used to produce a sinter. Impurities include silicon, magnesium, calcium, and so on. For example, silicon is contained in an amount of 10 mass ppm or less, and preferably about 3 mass ppm, calcium, magnesium, and other alkaline earth metal elements preferably account for a total of no more than 5 mass ppm, and if aluminum is present, the amount is preferably no more than 5 mass ppm. Iron, chromium, and other transition metal elements are undesirable because they can color the sinter. This does not apply, however, to situations when they are added intentionally as coloring elements or laser active elements.

The method for producing a molded article can be extrusion molding, injection molding, press molding, casting, and so forth. Preferably, the yttrium sintering auxiliary is added so as to be uniformly dispersed during the formation of the molded article or at some stage prior to this. In the case of press molding, for example, a suitable amount of yttrium is added to the slurry used to produce granules. Alternatively, yttrium may be added at the raw material synthesis stage, or the calcining stage. If the yttrium is added at the molding stage, for example, it may be added as a yttrium oxide micropowder. The additives preferably have a particle size that is about the same as or smaller than the particle size of the raw material powder, so that the additives will be uniformly dispersed. If the yttrium is added at the raw material synthesis stage, it may be added as an aqueous solution of yttrium chloride, yttrium hydroxide, or the like.

If desired, the binder is removed from the molded article thus obtained, in an oxygen atmosphere and at a temperature below the temperature at which the pores on the surface of the sample are closed off (such as below 1400° C.). If no binder has been added, then this binder removal treatment is unnecessary. Upon the binder removal treatment, the sample is sintered for at least 0.5 hour at a temperature of at least 1450° C. and no higher than 1750° C, in hydrogen, a rare gas, or a mixed atmosphere of these, or in a vacuum. The sintering time is from 0.5 to 10 hours for the entire article to be uniformly sintered.

To obtain a sinter with good translucency at a good yield, HIP is performed at a temperature of at least 1450° C. and no higher than 1750° C. and a pressure from 49 to 196 MPa, for a duration of 0.5 to 2 hours, after the sintering in this atmosphere.

Preferred working examples for implementing the present invention will now be given.

WORKING EXAMPLES

Test Example 1

A lutetium halide aqueous solution with a concentration of 0.5 M (mol·dm$^{-3}$) was prepared by dissolving a high-purity lutetium oxide raw material powder with a purity of 99.99% in hydrochloric acid. 5 L of this solution was put in a polytetrafluoroethylene container and stirred. 2 L of an ammonium hydrogencarbonate solution with a concentration of 3 M (mol·dm$^{-3}$) was added dropwise at a rate of 5 mL/min to the lutetium chloride aqueous solution, and this was allowed to cure for 10 days at room temperature. After curing, the contents were filtered and washed with ultra-pure water for several times, then put in a 150° C. dryer and dried for 2 days. The precursor powder thus obtained was put in an alumina crucible and calcined in an electric furnace (1200° C. for 10 hours), which produced a lutetium oxide raw material powder with a BET value of 5.0 m$^2$/g, an average primary particle size of 0.13 μm, and a mass percentage of aggregated particles larger than 5 μm of 2% or less. The silicon content in the raw material lutetium oxide was 3 mass ppm or less calculated as metal, the total content of alkaline earth metal elements was 3 mass ppm or less calculated as metal, the aluminum content was less than 1 mass ppm calculated as metal, and the content of iron, chromium, and other transition metal elements was 5 mass ppm or less.

A yttrium oxide micropowder (UU Type, made by Shin-Etsu Chemical; average primary particle size of 0.2 μm) equivalent to 0.35 mass % calculated as yttrium metal with respect to the raw material was added to 50 g of the above raw material powder, 1 g of Flowlen G700 made by Kyoeisha Chemical (Flowlen is a trademark of Kyoeisha Chemical) was added as a deflocculant, and 0.25 g of PVB-BL 1 made by Sekisui Chemical (PVB-BL is a trademark of Sekisui Chemical) was added as a binder. 20 g of ethanol was added to this mixture, and the components were mixed for 40 hours using a nylon pot and nylon balls, which gave an alcohol slurry. This slurry was poured into a plaster mold to produce a molded article. This molded article was heated in an oxygen gas flow at a rate of 5° C./hour, and a degreasing treatment was performed for 50 hours at 1000° C. The amount of yttrium contained in the molded article was determined by ICP (inductively coupled plasma) emission analysis and found to be 0.34 mass %. The molded article density was determined by Archimedes' principle and found to be 61.0%. Next, this molded article was heated in a vacuum furnace to 1600° C. at a rate of 100° C./hr, and held at 1600° C. for 2 hours, after which it was cooled at 20° C./hr. The degree of vacuum during sintering was set to 10$^{-2}$ Pa or less. The sinter thus obtained was mirror-polished with a diamond slurry, and the linear optical transmissivity was measured with a spectrophotometer. As a result, the linear optical transmissivity (t=1 mm) at wavelengths of 500 and 800 nm was 80.2% and 81.2%, respectively.

This sample was thermally etched for 2 hours in air at 1500° C., after which the microstructure was observed, which revealed the sinter to have an average particle size of 5 μm. The average particle size of the sinter here was determined as aps=1.56 C/(MN), where C is the length of a line drawn at any place on a high resolution image (such as SEM), N is the number of particles lying on this line, and M is a multiplication factor. The sinter density was determined by Archimedes' principle, the result of which was an ideal density ratio of 99.997%. Also, this sinter was dissolved in pure water or the like in an autoclave, after which the yttrium content was determined by ICP emission analysis and found to be 0.34 mass %.

Test Examples 2 to 6 and Comparative Examples 1 to 5

Lutetia molded articles (molded article density of at least 59%) with various added amounts of yttrium were produced in the same manner as in Test Example 1. The binder was removed from each molded article, after which the product was sintered for 8 hours at 1630° C. in a vacuum. The linear optical transmissivity (t=1 mm) of the sinter at 800 nm, the yttrium content, and the average particle size were found in the same manner as in Test Example 1, the results of which are given in Table 1.

TABLE 1

Linear optical transmissivity of sinter at 800 nm, Y content, and average particle size

| Sample | Y Content | Average Particle Size (μm) | Linear Optical Transmissivity (%) |
|---|---|---|---|
| Comp. Ex. 1 | 0 mass ppm | 1.3 | 22.3 |
| Comp. Ex. 2 | 40 mass ppm | 3.2 | 55.2 |
| Comp. Ex. 3 | 85 mass ppm | 3.1 | 60.1 |
| Test Ex. 2 | 110 mass ppm | 3.9 | 80.5 |
| Test Ex. 3 | 750 mass ppm | 6.2 | 80.9 |
| Test Ex. 4 | 0.2 mass % | 7.6 | 81.3 |
| Test Ex. 5 | 0.45 mass % | 10.0 | 81.9 |
| Test Ex. 6 | 0.68 mass % | 12.7 | 81.7 |
| Comp. Ex. 4 | 0.75 mass % | 13.9 | 71.4 |
| Comp. Ex. 5 | 1.5 mass % | 20.1 | 35.7 |

Test Examples 7 to 10 and Comparative Examples 6 to 9

5 g of lutetia raw material powder with a purity of at least 99.9% and an average primary particle size of 0.27 μm was put in an alumina mortar, and yttrium oxide micropowder equivalent to 0.45 mass % calculated as yttrium metal with respect to the raw material was added, mixed, and pulverized. This powder was put in a metal mold with a diameter of 15 mm, and primary molding was performed at a pressure of 10 MPa, after which CIP (cold isostatic pressing) was performed to produce a molded article with a density of 60.5%. This molded article was sintered for 10 hours in a hydrogen atmosphere at various sintering temperatures. Table 2 shows the sintering temperature and the average particle size and linear optical transmissivity (t=1 mm) of the resulting sinter at 800 nm. It can be seen from these results that when the sintering temperature was at least 1450° C. and not higher than 1750° C., the average particle size was at least 0.7 μm and no more than 20 μm and the linear optical transmissivity was at least 80%, but when the sintering temperature was outside this range, the linear optical transmissivity was extremely low. Also, observation by SEM equipped with an EDX (energy dispersed X-ray analysis apparatus) confirmed a layer of precipitated yttrium at the grain boundary with the sinters of Comparative Examples 8 and 9, but no foreign phases were detected at the grain boundary with Comparative Examples 6 and 7 and Test Examples 7 to 10.

TABLE 2

Sintering temperature, and average particle size and linear optical transmissivity of sinter at 800 nm

| Sample | Sintering Temp. (° C.) | Av. Particle Size (μm) | Linear Optical Transmissivity (%) |
|---|---|---|---|
| Comp. Ex. 6 | 1400 | 0.4 | 15.3 |
| Comp. Ex. 7 | 1430 | 0.5 | 48.2 |
| Test Ex. 7 | 1460 | 0.7 | 80.5 |
| Test Ex. 8 | 1580 | 2.8 | 81.1 |
| Test Ex. 9 | 1670 | 8.9 | 82.3 |
| Test Ex. 10 | 1740 | 13.8 | 81.8 |
| Comp. Ex. 8 | 1770 | 27.4 | 57.7 |
| Comp. Ex. 9 | 1800 | 40.3 | 29.4 |

Test Examples 11 to 13 and Comparative Examples 10 to 12

Lutetium oxide raw material powders with an average primary particle size of 0.3 μm were produced in the same manner as in Test Example 1. A yttrium oxide micropowder equivalent to 0.5 mass % calculated as yttrium metal with respect to the raw material was added to this raw material powder, mixed, and pulverized, after which CIP molding was performed at different pressures to produce molded articles of different density. These molded articles were sintered at 1600° C. in the same manner as in Test Example 1. Table 3 shows the molded article density, and the linear optical transmissivity (t=1.0 mm) of the sinter at a wavelength of 500 nm.

TABLE 3

Sinter density, and linear optical transmissivity of sinter at wavelength of 500 nm (t = 1.0 mm)

| Sample | Sinter Density (%) | Linear Optical Transmissivity (%) | Aver. Particle Size (μm) |
|---|---|---|---|
| Comp. Ex. 10 | 48.8 | — | 22.5 |
| Comp. Ex. 11 | 52.8 | 40.6 | 20.2 |
| Comp. Ex. 12 | 57.6 | 67.8 | 17.4 |
| Test Ex. 11 | 58.1 | 80.2 | 9.6 |
| Test Ex. 12 | 60.1 | 80.8 | 6.1 |
| Test Ex. 13 | 62.0 | 81.6 | 3.2 |

The structure in Comparative Example 10 was such that portions sintered to a high density were freely linked to portions in which sintering had not proceeded much at all and bubbles remained, and the linear optical transmissivity could not be measured. The texture steadily became more uniform as the molded article density increased, and this was also accompanied by an increase in linear optical transmissivity. It can be seen from the results in Table 3 that the molded article density must be at least 58% to obtain a sinter with excellent translucency (a linear optical transmissivity of at least 80%).

Test Examples 14 to 16 and Comparative Examples 13 to 16

High-purity lutetia precursors were produced in the same manner as in Test Example 1, and lutetium oxide raw material powders with different primary particle sizes and degrees of aggregation were produced by varying the calcining temperature and duration. These raw material powders were used to produce molded articles in the same manner as in Test Example 1, and after degreasing in the same manner as in Test Example 1, they were sintered for 2 hours at 1700° C. in a vacuum. The yttrium content of all of the sinters was between 0.3 and 0.35 mass %. Table 4 shows the BET values of the primary particles of the raw material powder, the mass percentage of aggregated particles larger than 5 μm, and the linear optical transmissivity (t=1 mm) and average particle size of the obtained sinter.

TABLE 4

BET values of primary particles of raw material powder, mass percentage of aggregated particles larger than 5 μm, and linear optical transmissivity at a wavelength of 800 nm and average particle size of obtained sinter

| Sample | BET value (m$^2$/g) | Aggregated particles over 5 μm (mass %) | Lin. optical transmissivity (%) | Av. particle size (μm) |
|---|---|---|---|---|
| Comp. Ex. 13 | 1.3 | 2.5 | 68.5 | 15 |
| Test Ex. 14 | 2.5 | 4.9 | 81.4 | 19 |
| Comp. Ex. 14 | 2.6 | 11.9 | 38.4 | 26 |
| Comp. Ex. 15 | 6.5 | 16.1 | 40.8 | 35 |
| Test Ex. 15 | 9.5 | 9.1 | 80.1 | 4 |

TABLE 4-continued

BET values of primary particles of raw material powder, mass percentage of aggregated particles larger than 5 μm, and linear optical transmissivity at a wavelength of 800 nm and average particle size of obtained sinter

| Sample | BET value (m²/g) | Aggregated particles over 5 μm (mass %) | Lin. optical transmissivity (%) | Av. particle size (μm) |
|---|---|---|---|---|
| Test Ex. 16 | 14.8 | 7.6 | 80.6 | 0.8 |
| Comp. Ex. 16 | 19.8 | 6.1 | 55.1 | 0.5 |

In Comparative Example 13, because the primary particles of the raw material were large and low in activity, adequate translucency could not be obtained even though the mass percentage of aggregated particles was low. In Comparative Examples 14 and 15, because the mass percentage of aggregated particles larger than 5 μm was high, and in Comparative Example 16, because the BET value was high and the raw material powder was small, packing was inadequate during molding, and adequate translucency could not be obtained, just as in Comparative Example 13. The molded article density in Comparative Examples 14 to 16 was 56% or lower.

Test Examples 17 to 19 and Comparative Examples 17 and 18

Sinters obtained in the same manner as in Test Example 8 (sintering temperature of 1580° C., linear optical transmissivity at 500 nm and 400 nm of 80.2% and 58.4%, and average particle size of 2.8 μm) were subjected to HIP to improve the transmissivity. Table 5 shows the linear optical transmissivity (t=1 mm) at wavelengths of 400 and 500 nm and the average particle size of the sinters in the case in which HIP treatment is performed at various temperatures, times and pressures. The HIP treatment involved using argon gas as the pressure medium, raising the temperature at 800° C./hr by simultaneous temperature and pressure elevation method, holding the sinter at a specific temperature for a specific duration, and then cooling at 1000° C./hr. The optical transmissivity here decreased steadily as the wavelength of light became shorter, in a range of 500 to 400 nm, except for a specific absorption wavelength.

TABLE 5

HIP conditions (temperature, time, pressure) and average particle size and linear optical transmissivity of sinter at 400 nm and 500 nm

| Sample | Temp./° C. × time/hrs | Pressure (MPa) | Av. particle size (μm) | Linear Opt. Trans. (%) 500 nm | 400 nm |
|---|---|---|---|---|---|
| Test Ex. 17 | 1400 × 1 | 196 | 2.8 | 80.2 | 58.4 |
| Test Ex. 18 | 1680 × 0.5 | 196 | 12.0 | 80.9 | 78.8 |
| Test Ex. 19 | 1750 × 2 | 49 | 18.4 | 81.2 | 80.3 |
| Comp. Ex. 17 | 1800 × 1 | 196 | 29.8 | 58.5 | 38.9 |
| Comp. Ex. 18 | 1850 × 1 | 196 | 46.5 | 36.1 | 16.9 |

With sinters that had yet to undergo HIP treatment, the transmissivity at a wavelength of 500 nm was above 80%, but because numerous fine (submicron or smaller) pores were contained in the interior of the sinters, the transmissivity at a wavelength of 400 nm was 58.4% or less.[1] It can be seen from the results of the test examples that the HIP treatment flattened out these fine ports and markedly improved the transmissivity, especially at 400 nm. When the HIP was carried out at 1400° C., it had no effect, and when the HIP was carried out at 1800° C. or higher, it causes yttrium precipitation and abnormal grain growth, so transmissivity decreased.

Test Examples 20 and 21 and Comparative Examples 19 to 31

Various trivalent metals were added instead of yttrium in an amount of 100 mass ppm or 0.65 mass %, and lutetia molded articles with various additives (molded article density of 59% or higher) were produced in the same manner as in Test Example 1. The binder was removed from these molded articles in the same manner as in Test Example 1, after which they were sintered for 8 hours at 1630° C. in a vacuum, and the linear optical transmissivity (t=1 mm) of the sinter at 800 nm was determined. These results are given in Tables 6 and 7. It can be seen from these results that only yttrium works effectively.

TABLE 6

Additive (100 mass ppm) to lutetia molded article, and linear optical transmissivity of sinter at 800 nm

| Sample | Additive (100 mass ppm) | Linear optical transmissivity (%) |
|---|---|---|
| Test Ex. 20 | Y | 80.5 |
| Comp. Ex. 19 | Ga | 50.1 |
| Comp. Ex. 20 | La | 51.1 |
| Comp. Ex. 21 | Nd | 47.2 |
| Comp. Ex. 22 | Tb | 44.3 |
| Comp. Ex. 23 | Ho | 50.1 |
| Comp. Ex. 24 | Tm | 51.7 |
| Comp. Ex. 25 | Yb | 47.3 |

TABLE 7

Additive (0.65 mass %) to lutetia molded article, and linear optical transmissivity of sinter at 800 nm

| Sample | Additive (0.65 mass %) | Linear optical transmissivity (%) |
|---|---|---|
| Test Ex. 21 | Y | 80.6 |
| Comp. Ex. 26 | Ga | 30.1 |
| Comp. Ex. 27 | La | 32.1 |
| Comp. Ex. 28 | Nd | 38.4 |
| Comp. Ex. 29 | Ho | 28.9 |
| Comp. Ex. 30 | Tm | 37.4 |
| Comp. Ex. 31 | Yb | 39.5 |

Test Examples 22 to 24

Just as in Test Examples 20 and 21, neodymium, thulium, and holmium were added in an amount of 1 mass %, and yttrium in an amount of 0.35 mass %, to produce lutetia molded articles (molded article density of 59% or higher). The binder was removed from these molded articles, after which they were sintered for 8 hours at 1630° C. in a vacuum. The linear optical transmissivity (t=1 mm) of the sinter at 800 nm was determined in the same manner as in Test Examples 20 and 21, the results of which are given in Table 8. It can be seen from these results that the addition of other laser active elements besides yttrium is also effective.

TABLE 8

Additive to lutetia molded article, and linear optical transmissivity of sinter at 800 nm

| Sample | Additive (1 mass %) | Added yttrium (mass %) | Linear optical transmissivity (%) |
|---|---|---|---|
| Test Ex. 22 | Nd | 0.35 | 80.6 |
| Test Ex. 23 | Tm | 0.35 | 80.1 |
| Test Ex. 24 | Ho | 0.35 | 80.5 |

Test Example 25 and Comparative Example 32

Test Example 25: To conduct a laser oscillation test, a lutetium oxide raw material powder with an average primary particle size of 0.3 μm and to which 0.15% neodymium had been added was produced in the same manner as in Test Example 1. Ten molded articles to which 0.35 mass % yttrium had been added were produced in the same manner as in Test Example 1, and these were vacuum sintered for 8 hours at 1675° C. in a vacuum furnace. Both sides of the sinters thus obtained were mirror-polished, and the linear optical transmissivity (at a thickness of 1.25 mm) at a wavelength of 1080 nm was measured with a spectrophotometer, and was found to be at least 81.5% for all of the samples. FIG. 1 is a simplified diagram of the laser oscillation test apparatus. The light emitted from a laser diode 2 with an output of 1 W at 808 nm was converged by a lens 4 with a focal distance of 8 mm, and directed through a half-mirror 6 onto a neodymium-added lutetia sinter 8 (neither side of the sample had been giving an antireflective coating). The oscillator length was 10 mm, and an optical coupler 10 with a transmissivity of 3% at a curvature of 50 mm was used. The result of the oscillation test was a maximum output of 10 mW or higher and a slope efficiency of 10% or higher were obtained at an oscillation wavelength of 1080 nm for all ten of the sinters.

Comparative Example 32: Ten lutetia sinters to which 0.15% neodymium and 50 mass ppm aluminum had been added (added as an alumina sol prior to molding) were produced by the method described in Japanese Laid-Open Patent Application 2003-89578. The sinters thus obtained all had a linear optical transmissivity (1080 nm, thickness of 1.25 mm) of at least 81.3%. A laser oscillation test was conducted in the same manner as above, and as a result, three of the sinters had a maximum output of 10 mW or higher and a slope efficiency of 10% or higher, just as in the test example, but four had lower output and slope efficiency, and with the remaining three no laser oscillation whatsoever could be confirmed. This seems to indicate variance in the characteristics due to the difficulty of adding aluminum uniformly.

The invention claimed is:

1. A translucent sinter consisting essentially of lutetium oxide and having a yttrium content of at least 100 mass ppm and not more than 0.7 mass %, and the linear optical transmissivity at a thickness of 1 mm over a wavelength region from 500 nm to 6.5 μm is at least 80%.

2. The translucent lutetium oxide sinter according to claim 1, being characterized in that the average particle size of the sinter is at least 0.7 μm and not more than 20 μm, and
there is substantially no precipitation of a yttrium-containing hetero phase at the grain boundary in the sinter.

3. The translucent lutetium oxide sinter according to claim 1, being characterized in that a laser active element is added to the sinter to create a laser oscillator material.

4. A method for manufacturing a translucent sinter consisting essentially of lutetium oxide, being characterized in that a lutetium oxide powder with a BET (specific surface area) value of at least 2.0 m$^2$/g and not more than 15.0 m$^2$/g, a mass percentage of aggregated particles of 5 μm or larger of not more than 10%, and a purity of at least 99.9% is used to produce a molded article with a theoretical density ratio of at least 58% and a yttrium content of at least 100 mass ppm and not more than 0.7 mass %, and
this molded article is sintered for at least 0.5 hour in hydrogen, a rare gas, or a mixed atmosphere of these, or in a vacuum, at a temperature of at least 1450° C. and not higher than 1750° C. to create a lutetium oxide sinter.

5. The method for manufacturing a translucent lutetium oxide sinter according to claim 4, being characterized in that the sinter is subjected to hot isostatic pressing for at least 0.5 hour at a temperature from 1450° C. to 1750° C. and a pressure from 49 to 196 MPa.

* * * * *